Feb. 9, 1932.    B. H. SMITH    1,843,991
SUCCESSION TRANSMITTER
Filed Oct. 13, 1927    8 Sheets-Sheet 1

INVENTOR.
Boyd H. Smith.
BY
Fay, Oberlin & Fay
ATTORNEYS.

Feb. 9, 1932.  B. H. SMITH  1,843,991
SUCCESSION TRANSMITTER
Filed Oct. 13, 1927  8 Sheets-Sheet 2
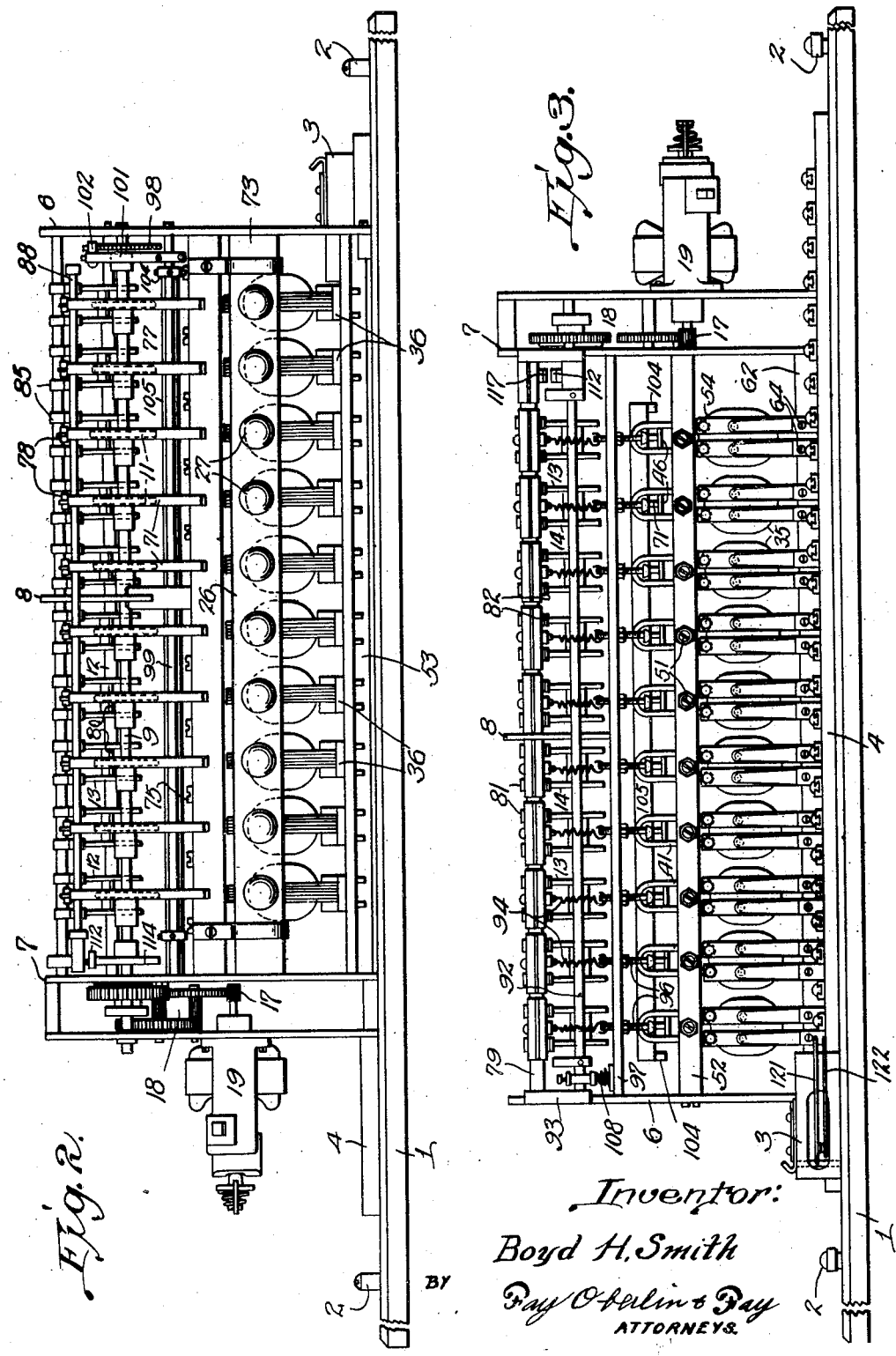
Inventor:
Boyd H. Smith
BY Fay O'Farlin & Fay
ATTORNEYS Feb. 9, 1932.     B. H. SMITH     1,843,991
SUCCESSION TRANSMITTER
Filed Oct. 13, 1927     8 Sheets-Sheet 3

INVENTOR.
Boyd H. Smith
BY
Fay, Oberlin & Fay
ATTORNEYS

Feb. 9, 1932.    B. H. SMITH    1,843,991
SUCCESSION TRANSMITTER
Filed Oct. 13, 1927    8 Sheets-Sheet 4

INVENTOR.
Boyd H. Smith
BY
Fay, Oberlin & Fay
ATTORNEYS

Feb. 9, 1932.　　　B. H. SMITH　　　1,843,991
SUCCESSION TRANSMITTER
Filed Oct. 13, 1927　　8 Sheets-Sheet 5

INVENTOR.
Boyd H. Smith
BY
Fay, Oberlin & Fay
ATTORNEYS

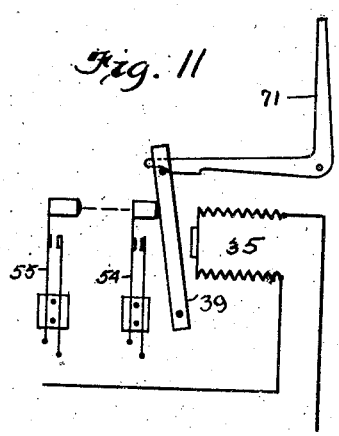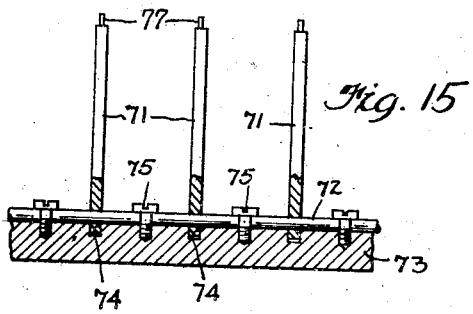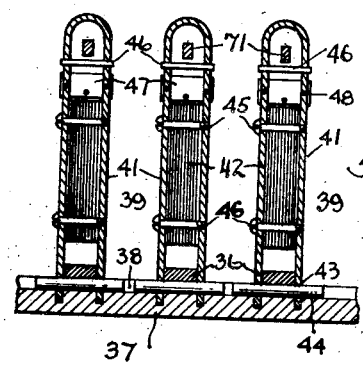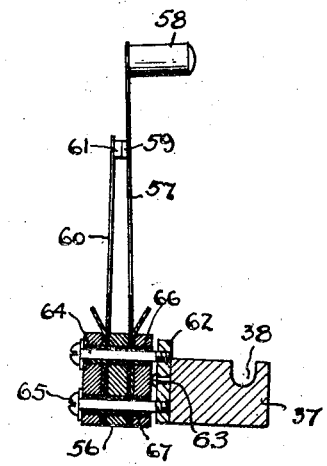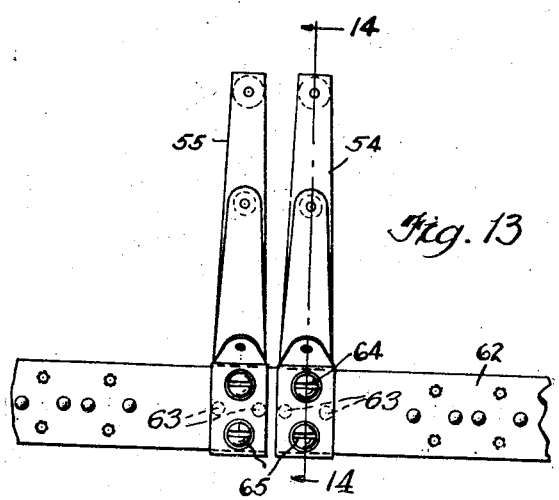

INVENTOR.
Boyd H. Smith
BY
Fay, Oberlin & Fay
ATTORNEYS.

Patented Feb. 9, 1932

1,843,991

UNITED STATES PATENT OFFICE

BOYD H. SMITH, OF SHELBY, OHIO, ASSIGNOR TO THE AUTOCALL COMPANY, OF SHELBY, OHIO, A CORPORATION OF OHIO

SUCCESSION TRANSMITTER

Application filed October 13, 1927. Serial No. 225,896.

This invention as indicated relates to a succession transmission for an electric signalling system. More particularly it comprises a signalling apparatus adapted to a variety of uses and of especial advantage in connection with the supervision of automatic sprinkler systems. It includes apparatus whereby a multiplicity of signals may be automatically transmitted to a receiving and selecting mechanism, and thereafter transmitted in succession without interference. It also includes in a single apparatus, mechanism for giving continuous signals indicating water flow and discontinuous or occasional signals indicating valve positions. The apparatus provides for a centralized drive, interlocking non-interfering succession coding of signals, with full automatic operation, with common motor switch control, a common armature lock, and with coding contacts in a single series connection. A pilot light is preferably provided on each transmission unit so that the apparatus may readily be checked as to its operation. To the accomplishment of the foregoing and related ends, said invention, then, consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

Figure 1:
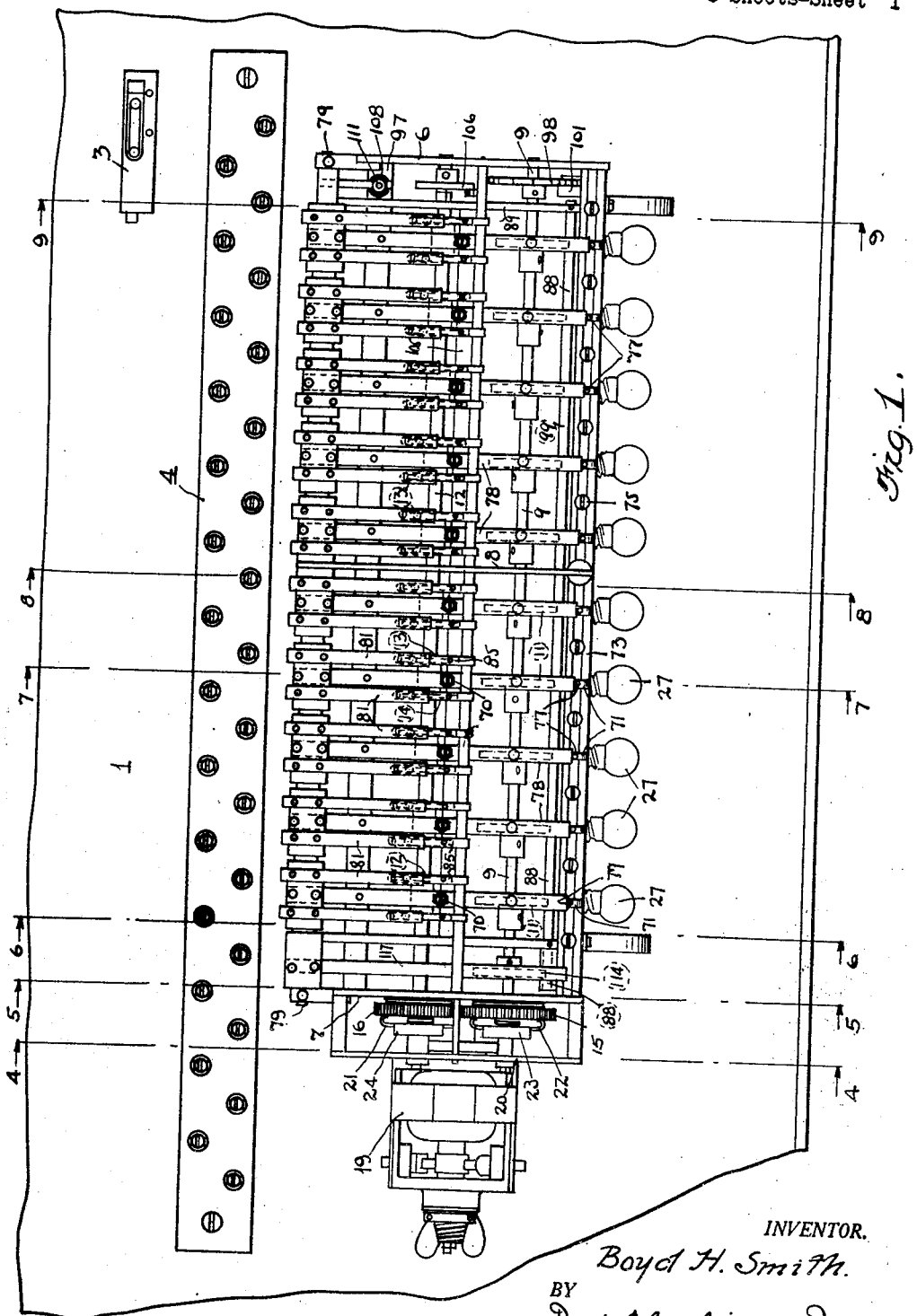
Figure 4:
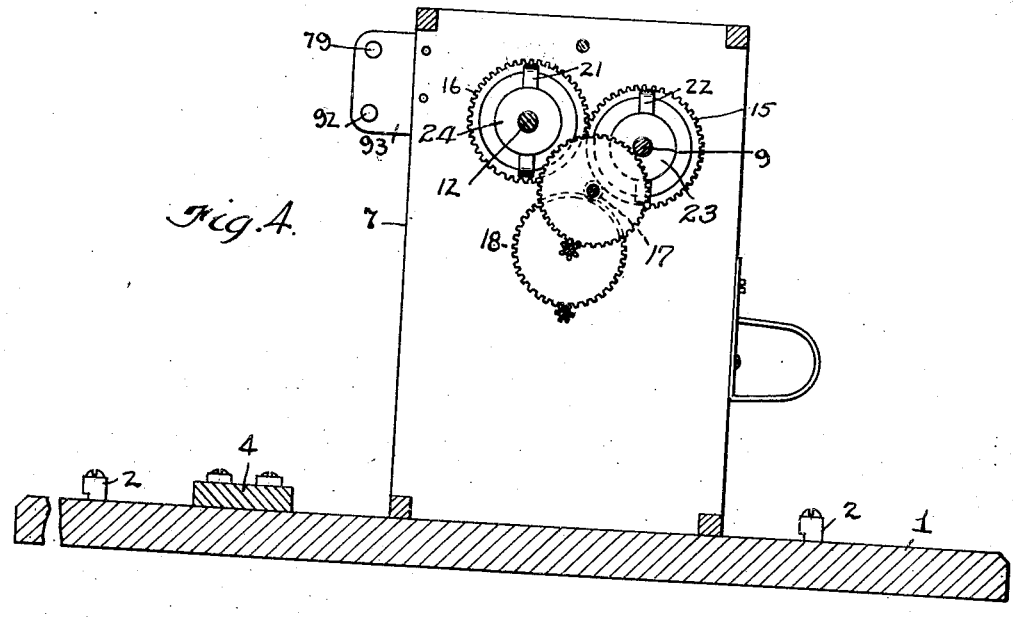
Figure 5:
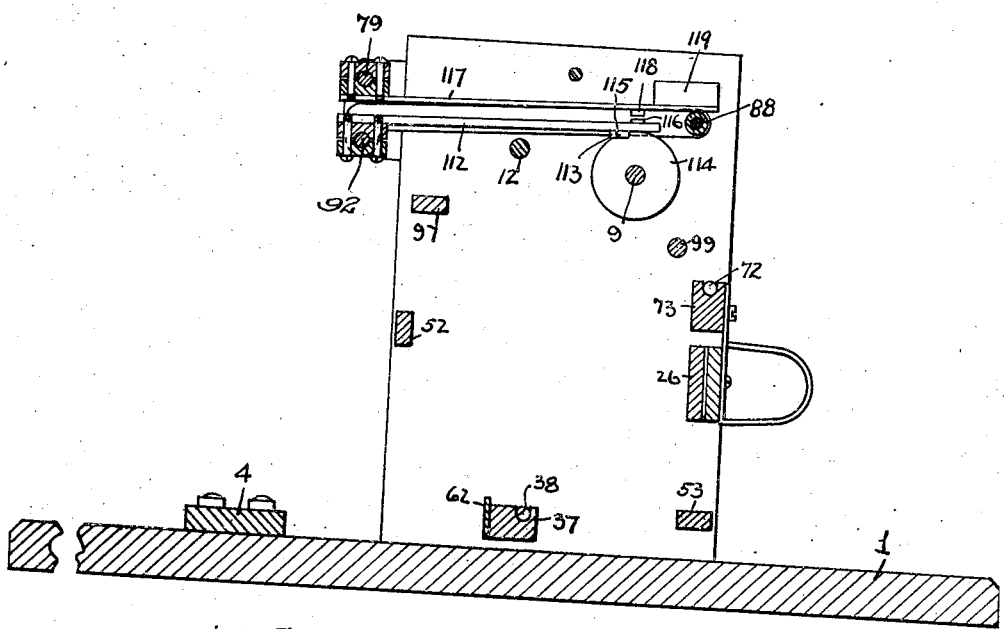
Figure 10:
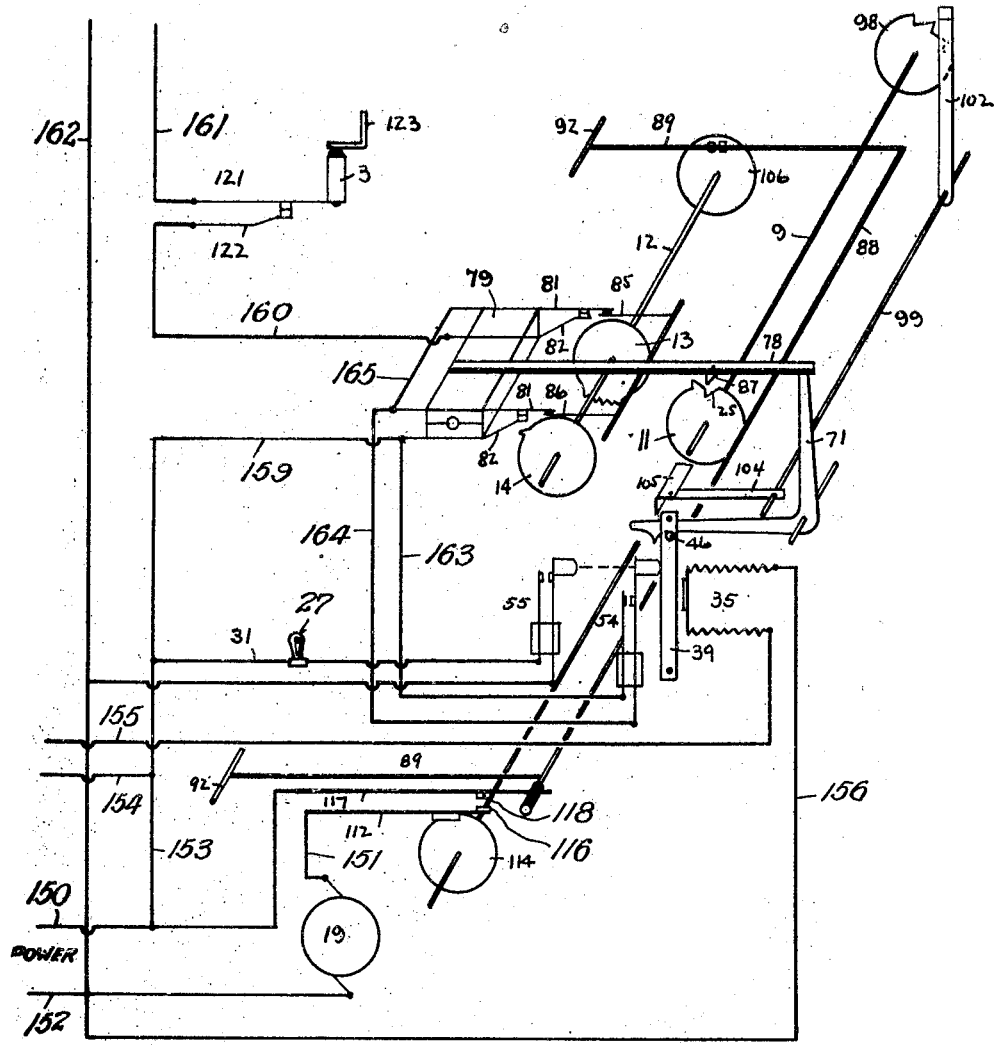
Figure 16:
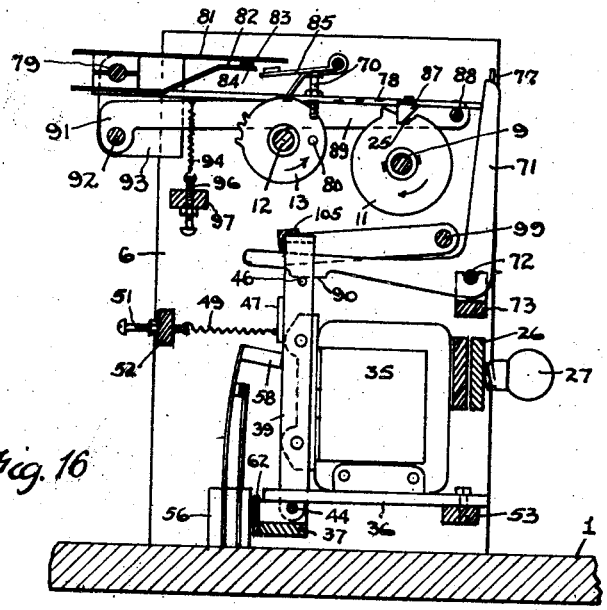
Figure 17:
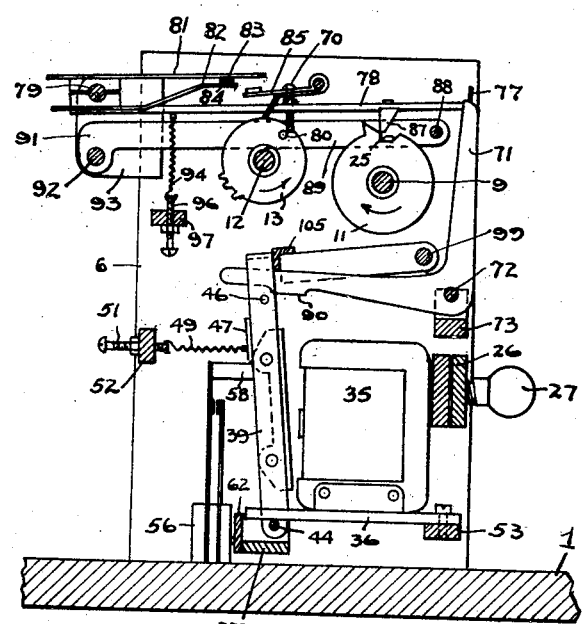

In said annexed drawings:

Fig. 1 is a top plan view of an apparatus embodying the principles of my invention, the cover portion of said apparatus being removed; Fig. 2 is a front elevation of the apparatus shown in Fig. 1; Fig. 3 is a rear elevation of the apparatus shown in Fig. 1; Figs. 4 to 9 are transverse vertical sectional views taken respectively along the lines 4—4, 5—5, 6—6, 7—7, 8—8, 9—9, shown in Fig. 1, looking in the direction of the arrows; Fig. 10 is a diagrammatic view showing the operative parts of the actuating mechanism and the circuit connections thereof; Fig. 11 is a diagrammatic view of a relay and latch mechanism; Fig. 12 is a transverse sectional view of a series of armature members; Fig. 13 is a front elevation of a pair of contact arms; Fig. 14 is a sectional view of the contact arms taken along the line 14—14 shown in Fig. 13 looking in the direction of the arrows; Fig. 15 is a sectional detail view showing the means for pivoting the individual latch arms; and Figs. 16 and 17 are sections similar to Fig. 6, but showing two other positions assumed by the parts of the illustrated device during an operative cycle.

As is clearly shown in Fig. 1 of the drawings, the apparatus comprises a base plate 1 having a series of studs 2 to receive a cover (not shown) and provided with a section (not shown) and provided with a section (not shown) adjacent one corner to indicate when the cover is removed and replaced. A panel block 4 for circuit connections is located immediately at the rear of the apparatus. Immediately in advance of the panel block, the succession transmission mechanism 5 is located.

Said mechanism comprises a frame having a pair of vertical end members, 6, 7, and an intermediate member 8, which serve as supports for a pair of longitudinally extending shafts, one of said shafts 9 carrying a series of selector wheels 11, and the other of said shafts 12 carrying a double series of code wheels 13, 14. Intermeshing driving gears 15, 16, are loosely mounted on the ends of said respective shafts, which project through one of said end plates 7, and said gear 15 is engaged by a driving pinion 17 forming part of a gear train 18 actuated by a small electric motor 19. The motor is supported on a plate 20 held in spaced relation to the adjacent end plate 7 of the frame, and serving as a journal plate for the shafts of the gear train. The loose drive gears are each provided at their ends with a plurality of U-shaped leaf springs 21, 22, the free ends of which rest against driving discs 23, 24, secured respectively on the selector shaft 9 and code wheel shaft 12 for rotation therewith. In this manner a friction drive is provided for each of said shafts, and latching mechanism, later to be described, may stop the rotation of either of said shafts without interfering with the continuous operation of the other shaft or of said driving motor. The details of the mechanism of the motor form no part of the present invention.

The number of selector wheels mounted on the selector shaft equals the number of circuits to be supervised and the number of code wheels provided for is double the number of circuits to be supervised, each circuit being provided with a main code wheel and a shunt circuit code wheel for emergency use as will be hereinafter explained. The main selector wheels are each provided with a notch 25 and each unit of the series of ten main selector wheels is so positioned on the selector wheel shaft that its notch is spaced one-tenth of the circumference in clockwise arrangement behind the notch in the preceding wheel.

As is shown in the drawings the selector shaft lies parallel to the front of the frame and closely adjacent thereto with the code wheel shaft spaced rearwardly thereof and positioned at a slightly higher elevation. On the front face of the apparatus a panel board 26 is secured which serves as a mounting for a series of pilot lights 27.

Figure 6:
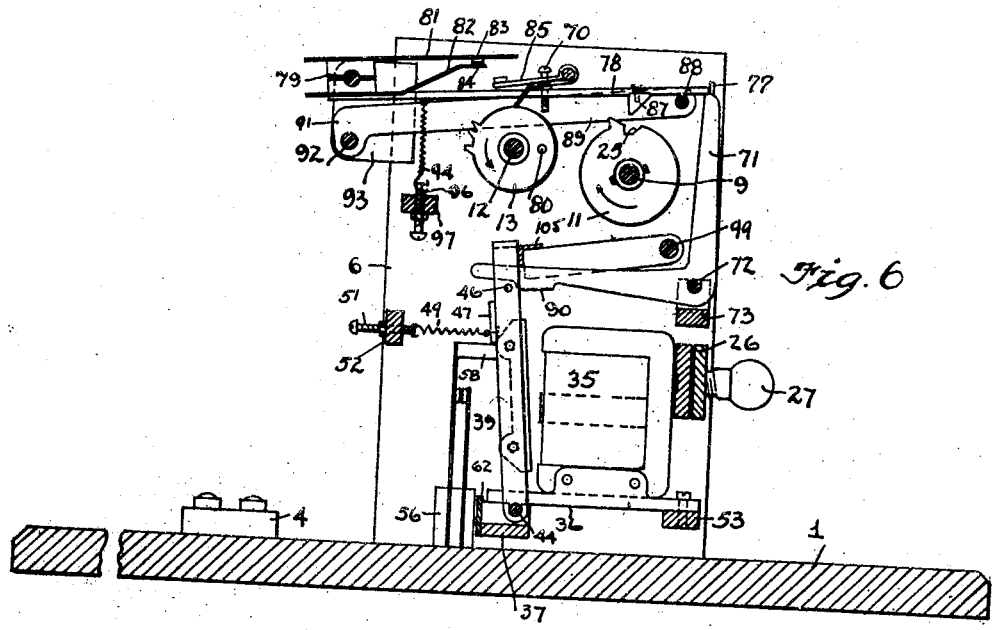
Figure 7:
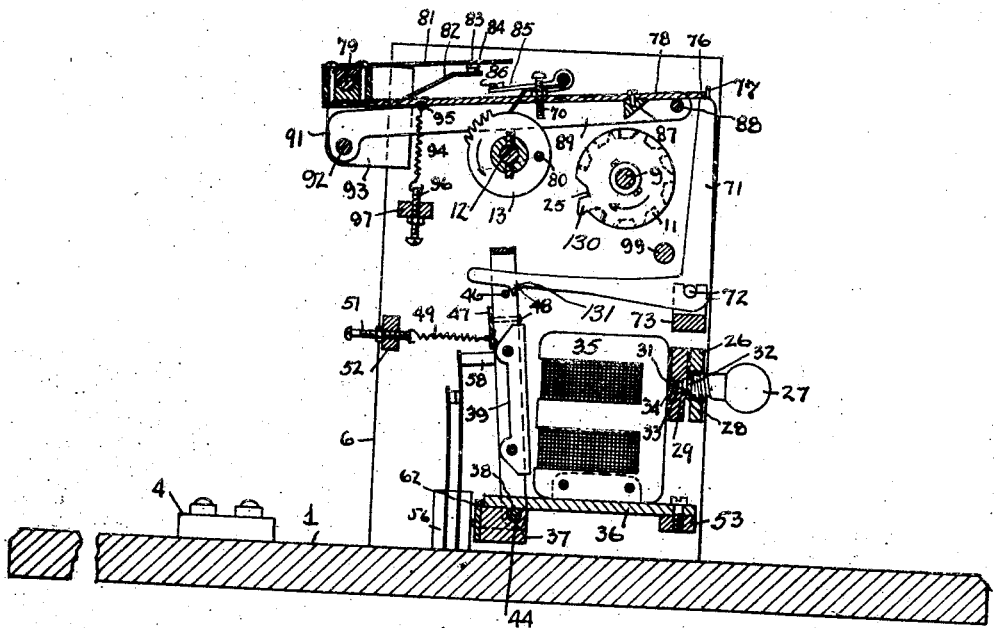
Figure 8:
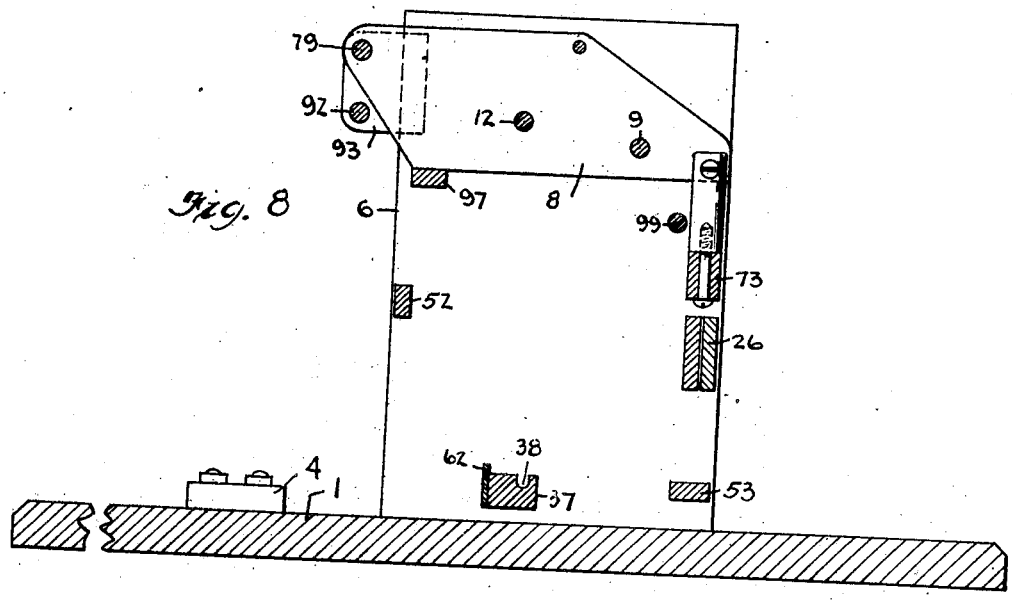
Figure 9:
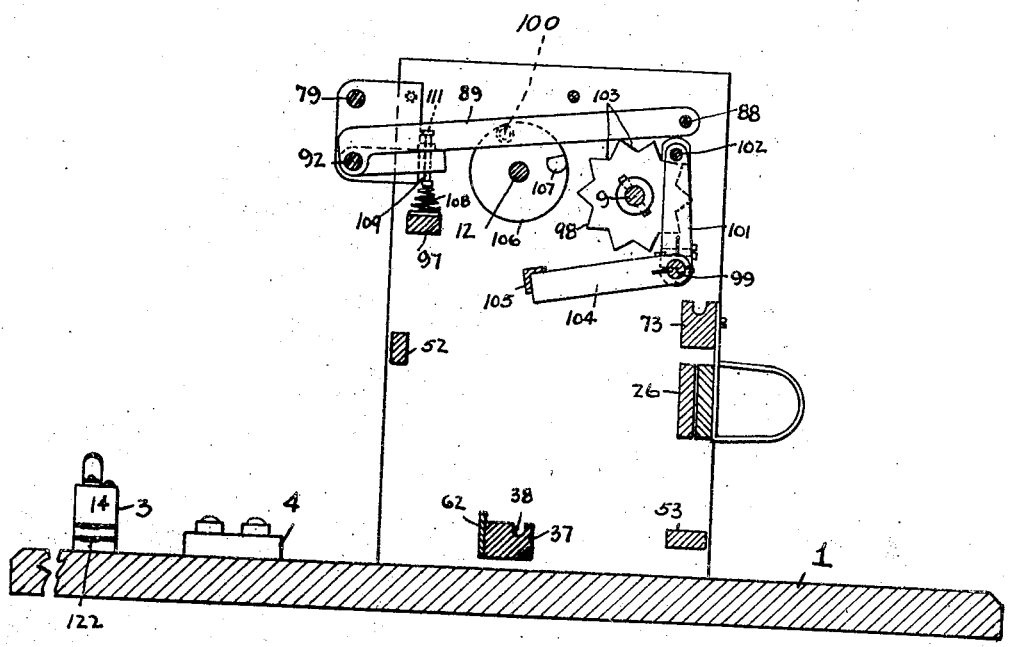

As is more particularly shown in Fig. 7 of the drawings, the pilot lights have screw sockets 28 and central contact points 29, insulated therefrom, which sockets are engaged at spaced intervals in the support and have circuit connections 31 from each lamp to the respective circuits of the apparatus. The central contact 32 of each lamp engages a pin 33 connected with a bus bar 34 at the rear of said pilot light support which forms a common connection for the entire system. Immediately behind the row of pilot lights, the relay coils 35 are positioned. Each of these coils, as will appear from Figs. 6 and 7, is mounted upon a base plate 36 which extends rearwardly beyond said relay and is adapted to bear against the upper surface of a cross bar 37 which is provided with a groove 38 on its upper surface to form a bearing for the respective armatures 39 of the relays.

As is more particularly shown in Fig. 12 of the drawings, each armature comprises a yoke 41 within which are positioned a series of laminated plates 42 secured to the yoke members. Each of these yokes comprises a sheet metal strip bent to inverted U-shape and having its free ends 43 perforated to receive a journal pin 44. The laminated plates occupy the intermediate space being held therein by screws 45 and above said plates a trip pin 46 is set transversely of the yokes. To the rearward portion of each yoke, a spring supporting plate 47 is held by pins 48 passing through the sides of the yoke member. A coil spring 49 has its one end secured to said plate and its other end secured to an adjusting screw 51 engaged through a supporting bar 52 extending transversely of the frame. Said screw and spring afford a means for adjusting the tension on the armature.

The base plate supports for the relays are adapted to be secured at their forward ends to a cross bar 53 and at their rearward ends extend over the pivot pins 44 of the armatures. Immediately behind each armature are positioned two sets 54, 55, of spring contact arms shown in enlarged detail in Figs. 13 and 14 of the drawings. Each set of contact arms comprises an insulating block 56 formed of three slabs having supported between the same on the inner side, an upwardly extending spring metal strip 57 having at its upper end a forwardly projecting lug 58 and having a contact point 59 on its face. Between said slabs on the outer side a shorter spring finger 60 is positioned, said finger carrying a contact point 61 on its outer face in a position to engage with the contact point 59 of the longer spring finger 57. The contact set illustrated in Fig. 14 is for open circuit work, while the sets shown diagrammatically in Fig. 11, are for closed circuit work, the action merely being reversed as will be obvious without further description.

The spring contact arms are supported on the cross bar 37 which has secured to its rearward face a brass strip 62. Said brass strip is provided with a pair of fulcrum points 63 located on a central longitudinal line of said block and spaced so as to form bearing points at either side of each built-up insulating block 56. Each such block is held against one pair of said fulcrum points by means of two screws 64, 65, engaged through inserting sleeves 66, 67 along a vertical central line of each of said sets of contact arms, the screw-threaded ends of said screws being engaged through screw-threaded apertures through said brass strip.

By means of the structure just described, the operative position of the sets of contact arms may be regulated to a nicety, the upper screw 64 being released and the lower screw 65 being tensioned slightly to move the set of contact arms rearwardly or away from the armature and the adjustment being reversed to move the set toward the armature.

Immediately above the operating relays a plurality of releasing latches 71 of bell crank shape are positioned. Said latches, as is shown in Fig. 15, are provided adjacent their angles with pivot pins 72 which extend to each side thereof and are adapted to be received in a grooved supporting bar 73 extending transversely of the apparatus. Each releasing latch is adapted to seat in a groove 74 formed in the supporting bar and its pivot pin 72 is adapted to be received in the transverse groove. The pins are of such length that adjacent pivot pins are spaced from each other a distance sufficient to permit the passage between them of a securing screw 75. Thus by the simple expedient of removing two screws, any release latch may be removed. The upper end 76 of the releasing latch is provided with an upstanding pin 77 against which bears the forward end of a transmission contact arm 78. Said contact arm 78 is provided with a lift screw 70 which is actuated by a contact pin 80 extending between each pair of code wheels (see Figs. 2, 6 and 7). Said contact arm is pivotally mounted at its rearward end on a supporting bar 79 which carries at either side of said contact arm 78, a pair of spring contact fingers 81, 82, having contact points 83, 84, on their adjacent faces. The upper of each of said pairs of contact fingers is longer than the companion lower finger and each of said upper fingers is adapted to contact with a short contact arm 85, carrying an insulating button, 86, actuated by one of the code wheels 13, 14, heretofore described, and positioned immediately beneath the central portion of each long contact arm 78.

Forwardly of each code wheel one of the selector wheels 11 is positioned, and immediately above the selector wheel the contact arm 78 carries a beveled lug 87 adapted to coact with a notch 25 in the selector wheel. Immediately behind the upper end of the release latch and normally serving as support for the transmission contact arm 78, is a common control bar 88. Said control bar is supported by a plurality of arms 89 extending substantially parallel to and beneath the transmission contact arms, and having downwardly extending rearward ends 91 perforated to receive a pivot pin 92 by means of which they are secured to a supporting plate 93 pinned to the end supports 6 and 7 of the frame.

The transmission contact arm 78 is held against the common control bar by means of a coil spring 94 having its one end secured to a fastening element 95 adjacent the rearward end of said arm and extending downwardly to have its opposite end engaged through an aperture in an adjusting screw 96 supported on a longitudinal cross-bar 97. Adjacent the end of the common control bar 88, a star wheel 98 is positioned, said wheel being mounted on the selector shaft 9, as is clearly shown in Fig. 9 of the drawings. The star wheel is positioned above an armature lock shaft 99 extending completely across the apparatus, said shaft having fixed thereto an actuating arm 101 carrying at its upper end a roller 102 adapted to coact with notches 103 in said star wheel. The armature lock shaft has a substantially horizontal arm 104 adjacent each end carrying an angle plate 105 adapted to engage the front face of the upper end of each armature and lock the same against change of position. The star wheel has ten notches to correspond with ten selector wheels and is brought into operation each time a selector wheel is released when the mechanism moves to operative position with a succeeding selector wheel. The code wheel shaft 12 carries a control bar disc 106 having an operating lug 107 which serves to lock code wheel shaft from turning during the selecting period.

Referring to Fig. 6 and supposing that one of the armatures not shown in said figure is held in contact with its magnet, it will be seen that the locking bar 105 holds the armature illustrated in Fig. 6, together with all other armatures, out of contact with their respective magnets. As soon as the code corresponding with the actuated magnet has been completed, the shaft 99 is oscillated to move the locking bar 105 out of engagement with the armatures. Supposing that the circuit controlling the armature illustrated in Fig. 6 has been closed during transmission of said above mentioned code, the armature will be drawn into contact with its magnet as soon as the bar 105 is raised out of engagement therewith. Immediately thereafter the locking bar 105 again drops into contact with the remaining armatures to prevent their actuation during the transmission of the code controlled by the mechanism disclosed in Fig. 6. After selective action of said mechanism and the further depression of the lever 89, the lug 107 will clear the pin 100 carried by said lever, thus releasing said code wheel shaft. A coil spring 108 abuts at its one end against the cross bar 97 and at its other end against an extension stem 109 which engages a flanged terminal surface 111 on the lever 89 to urge the control bar 88 to its raised position.

The motor switch comprises a lower arm 112 pivoted on the shaft 92 and having a lug 113 on its under side. A disc 114, of insulating material having a peripheral notch 115 is mounted on the selector shaft 9 and is thus positioned beneath the said lower switch arm 112 which latter carries on its upper side a contact point 116. An upper switch arm 117 is pivoted upon the supporting bar 79 and may rest upon the common control bar 88. It carries a contact point 118 at one end and adjacent thereto is provided with a small weight 119 to insure positive action. When the common control bar 88 is lowered through the action of one of the relays, the motor is set into action and the selector shaft is driven in a clockwise direction. After the complete rotation of the selector shaft has been accomplished, the common control bar will be elevated so that the mechanism is stopped in initial position unless in the interval a relay has been operated in which event the control bar will be held in a depressed position until the code of that circuit has been transmitted, and the transmission contact arm 78 thereof has been restored. After the apparatus is cleared of all codes, the motor continues to run until the initial position is reached, at which time the motor switch contacts separate and the motor stops.

The code wheel shaft as has been indicated, carries a plurality of pairs of code wheels, one wheel of each pair being adapted to transmit the regular signal, and the other of each pair being adapted to coact with the regular signal to indicate the restoration of the normal conditions in its circuit.

Contacts made behind the armatures comprise shunt contacts and the pilot light contacts. When the armature is released, the pilot light contacts are brought together and the pilot light is illuminated. At the same time the shunt contacts are closed, shunting out contacts 81'—82', thus allowing the code from wheel 13 to be transmitted, but not the code from wheel 14. From the above description much of the operation of the apparatus has been indicated but in order to have a connected idea, a summary of said operations will now be made.

In the diagrammatic view shown in Fig. 10 of the drawings, a tamper switch 3 is illustrated, such switch comprising a pair of spring contact arms 121, 122, normally spaced apart and adapted to be forced into contact by means of an angle plate 123, carried on the cover of the apparatus. The tamper switch is in the recorder circuit and the making and breaking of the contact produces a record on the recording instrument.

Considering the apparatus as applied to a sprinkler system, the device as set up will accommodate three water-flow circuits and seven supervising circuits. Each water-flow circuit is provided with a number of normally open contacts with high resistance shunt so that the closing of any one of the contacts indicating water-flow will complete the circuit to the corresponding relay of the transmitter as follows:—power line 150—wire 153—wire 154—flow-controlled switch (not shown)—wire 155—magnet 35—wire 156—power line 152. Current flow through such circuit energizes the magnet 35 to attract its armature 39. The armature 39 of this relay in its movement toward its magnet 35 trips the L-shaped latch 71 dropping the transmission contact arm 78 until the lug 87 contacts with the periphery of the wheel 11. This partially depresses the common control arm 88 and moves the contact 118 on the arm 117 into contact with the contact 116 on the arm 112 to establish a circuit as follows:—power line 150—arm 117—contact 118—contact 116—arm 112—wire 151—motor 19—and power line 152. Flow through this circuit starts the motor which frictionally drives the selector shaft 9. As the selector shaft 9 turns, the lug 87 of the depressed transmission contact arm 78 will drop into the notch 25 of its selector wheel 11 and stop the rotation of the selector shaft. As the transmission contact arm is thus lowered into the notch of the selector wheel 11, it tilts the contacts 81, 82, 81' and 82' carried on the block 79 into coding position, lowering the shunt contacts 82 and 82' and approaching the upper contacts 81 and 81' toward the individual arms 85, for the respective code wheels. It also releases the code wheel shaft by moving the pin 100 out of the path of the stop lug 107 on the disc 106 by further depression of the common control bar 88.

The code wheels 13, 14, are all revolved by the code wheel shaft but the only code to be transmitted will be that wherein the contacts have been lowered sufficiently to bring the same within the path of movement of the button 86 on the corresponding arm 85. It will be seen that the contacts 83—84 are normally closed and are adapted to be separated momentarily by the action of the fingers 85 under the influence of the code wheel 13. Thus there is normally a flow of current through the recorder in the following circuit:—power line 150—wire 153—wire 159—contact arm 82'—contact arm 81'—wire 165—arm 81—contact 83—contact 84—arm 82—wire 160—contact 122—contact 121—wire 161—recorder (not shown)—wire 162 and power line 152. Obviously, when the contacts 83—84 are separated, this circuit is broken and a signal is thus transmitted to the recorder.

As long as the armature 39 is attracted to the magnet 35, the contacts of the pilot light switch 55 will be separated, as will also the contacts of the shunt switch 54. When, however, the armature 39 is released, the contacts of the switch 54 are moved together, and a shunt circuit is established around the contact arms 81' and 82' which are cooperative with the code wheel 14. With the parts in this position, it will be obvious that separation of the contact arms 81'—82' will not affect the recorder, since current will continue to flow through a circuit as follows:—power line 150—wire 153—wire 159—wire 163—shunt switch 54—wire 164—wire 165—arm 81—contact 83—contact 84—arm 82—wire 160—contact 122—contact 121—wire 161—recorder—wire 162 and power line 152. The switch 55 will likewise be closed, of course, to establish a circuit through power line 150—wire 153—circuit 31 including the lamp 27 and the switch 55—wire 162 and power line 152 to light the lamp 27.

After the code has been transmitted, the lift pin 80, between the code wheels engages the lift screw 70 on the contact arm raising the stop block 87 out of the selector wheel notch 25. The common control bar 88 is forced by the spring 108 to follow this arm up and the revolution of the code wheels is stopped by the pin 100 on the control arm 89 just after the lift pin has passed the lift arm screw.

The selector wheel having been released, its cam 130 continues to raise the contact arm until the L-shaped latch drops under it. This completes the action as far as that code is concerned. If a signal has come in over any other circuit in the meanwhile, the selector shaft will revolve until that circuit is found. The same procedure is repeated and its code is transmitted. When all codes have been transmitted the common control bar lifts and when the motor switch cam wheel revolves to the starting point below, the lower switch bar drops away. The upper is held up by the common control bar. The motor switch opens and the motor stops with the apparatus set for another signal.

While the apparatus is in the process of selecting, the common armature lock is alternately locking and releasing the armatures until an operated transmission contact arm is found. The movement of other armatures will not affect the transmitted signal since no other signal can be transmitted until the corresponding selector wheel is in the position shown in Fig. 16. The water-flow transmitters have a special cam 90 (Fig. 6) on the release latch which holds the latch out of engagement with the end of the contact bar while the circuit is energized, thus transmitting a repeated code, while the supervising transmitter is provided with a cam 131 (Fig. 7) that permits the sending of one code when deenergized, and another upon the restoration.

A distinctive restoration code is given when the circuit becomes normal. The supervising transmitters are arranged to send one signal on an open circuit and a distinctive restoration code is given when the circuit becomes normal. The distinctive restoration codes comprise the adding of a dot and dash to the trouble code. Thus if the trouble code is three, the restoration code will be one dash three. By this arrangement, the circuit identification is retained. Restoration code is given through the pair of contacts located on the armature pivot block which are shunt connected to a corresponding set on the contact arm. A code wheel with one tooth operates under one of these upper contacts to open and close them ahead of the regular codes, the lower contacts being operated by the armature are arranged to be closed when the circuit is in trouble and to be open when the circuit is normal. Then the upper contacts circuit is normal. Then the upper contacts are shunted out during a trouble code but are cleared for restoration code. A second pair of contacts are located on the armature pivot block and actuated by the armature. These control the pilot lights on the front of the apparatus. The pilot lights are illuminated when the armature is actuated for regular trouble code operation, and continue to burn until the circuit is restored to normal conditions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A non-interference succession transmitter comprising a plurality of magnets each connected in a separate circuit, an arm carrying contact mechanism individual to each magnet having normal, intermediate and operating positions, means controlled by each magnet when its circuit is altered for controlling the movement of its corresponding arm to intermediate position, a selecting mechanism having means for successively controlling the movement of each arm from intermediate to operating position during an operating cycle, means controlled by the movement of any arm from normal to intermediate position for starting the operation of the selector mechanism, coding mechanism individual to each contact arm and cooperating therewith to transmit an individual code when the corresponding contact arm is in operative position and means controlled by the coding mechanism for restoring the contact arm to normal at the end of the transmission of the code.

2. A non-interference succession transmitter comprising a plurality of magnets each connected in a separate circuit, an arm carrying contact mechanism individual to each magnet having normal, intermediate and operating positions, means controlled by each magnet when its circuit is altered for controlling the movement of its corresponding arm to intermediate position, a selecting mechanism having means for successively controlling the movement of each arm from intermediate to operating position during an operating cycle, means controlled by the movement of any arm from normal to intermediate position for starting the operation of the selector mechanism, coding mechanism individual to each contact arm and cooperating therewith to transmit an individual code when the corresponding contact arm is in operative position, and means controlled by the coding mechanism for restoring the contact arm to normal at the end of the transmission of the code, and a common armature lock for said armatures successively moving into and out of armature locking position until it contacts a single actuated armature.

Signed by me this 8 day of Oct., 1927.

BOYD H. SMITH.